United States Patent
Zacek et al.

(10) Patent No.: US 11,711,228 B1
(45) Date of Patent: Jul. 25, 2023

(54) ONLINE MEETING MONITOR

(71) Applicant: Microsoft Technology Licensing, LLC, Redmond, WA (US)

(72) Inventors: Ondrej Zacek, Prague (CZ); Milica Jovanović, Prague (CZ); Tanner Daniel Moehle, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/728,422

(22) Filed: Apr. 25, 2022

(51) Int. Cl.
   *H04L 12/18* (2006.01)
(52) U.S. Cl.
   CPC ...... *H04L 12/1822* (2013.01); *H04L 12/1818* (2013.01)
(58) Field of Classification Search
   CPC .................. H04L 12/1822; H04L 12/1818
   See application file for complete search history.

(56) References Cited

U.S. PATENT DOCUMENTS

| | | | |
|---|---|---|---|
| 10,735,211 B2 | 8/2020 | Vogel et al. | |
| 11,017,358 B2* | 5/2021 | Grinolds | H04L 12/1818 |
| 2009/0030767 A1 | 1/2009 | Morris et al. | |
| 2021/0185100 A1 | 6/2021 | Mombourquette et al. | |

FOREIGN PATENT DOCUMENTS

| | | |
|---|---|---|
| IN | 202011050246 A | 1/2021 |
| WO | 2021214640 A1 | 10/2021 |

OTHER PUBLICATIONS

Akolawala, Tasneem, "Microsoft Outlook Lets You Create Short Auto-Breaks Between Back-to-Back Meetings", Retrieved From: https://web.archive.org/web/20210516005659/https:/gadgets.ndtv.com/apps/news/microsoft-outlook-break-before-after-meeting-settings-teams-rollout-2418773, Apr. 21, 2021, 4 Pages.
Fauville, et al., "Zoom Exhaustion & Fatigue Scale", In Journal of Computers in Human Behavior Reports, vol. 4, Jul. 6, 2021, 10 Pages.
Kumari, et al., "Detection of Driver Drowsiness Using Eye Blink Sensor", In International Journal of Engineering & Technology, vol. 7, Issue 3.12, Jul. 2018, pp. 498-504.
Soysal, et al., "Microsoft Teams User Activity Report", Retrieved From: http://web.archive.org/web/20211222075251/https://docs.microsoft.com/en-us/microsoftteams/teams-analytics-and-reports/user-activity-report, Nov. 18, 2021, 5 Pages.

* cited by examiner

*Primary Examiner* — Nazia Naoreen
(74) *Attorney, Agent, or Firm* — NovoTechIP International PLLC

(57) ABSTRACT

A data processing system is implemented for accessing information about a scheduled meeting of a user, the information including a start time and an end time of the scheduled meeting. The data processing system also implements determining a planned meeting time for the scheduled meeting based on the accessed information, receiving an attendance signal which indicates that the user has joined the scheduled meeting, and monitoring the attendance signal to determine an attended amount of time of the user in the scheduled meeting, wherein the attendance signal represents a user device of the user joining the scheduled meeting. Further, the data processing system implements determining an attendance ratio based on the attended amount of time and the planned meeting time for the scheduled meeting, and classifying the user as potentially fatigued based on the attendance ratio satisfying a threshold condition.

20 Claims, 11 Drawing Sheets

ONLINE MEETING MONITOR

BACKGROUND

In today's environment where many users utilize remote collaboration, users' daily schedules are often filled with many consecutive online meetings. Many users do not set time aside for taking breaks between these online meetings. As a result, online meetings may take up a majority of many users' time. Furthermore, consecutive online meetings may overwhelm an attendee of these online meetings.

Hence, there is a need for improved systems and methods of monitoring fatigue for an attendee of online meetings.

SUMMARY

An example data processing system according to the disclosure may include a processor and a machine-readable medium storing executable instructions. The instructions when executed cause the processor to perform operations including accessing information about a scheduled meeting of a user, the information including a start time and an end time of the scheduled meeting; determining a planned meeting time for the scheduled meeting based on the accessed information; receiving an attendance signal which indicates that the user has joined the scheduled meeting; monitoring the attendance signal to determine an attended amount of time of the user in the scheduled meeting, wherein the attendance signal represents a user device of the user joining the scheduled meeting; determining an attendance ratio based on the attended amount of time and the planned meeting time for the scheduled meeting; classifying the user as potentially fatigued based on the attendance ratio satisfying a threshold condition; and in response to the user being classified as potentially fatigued, performing a prescribed operation including: (1) causing a message to be displayed on a display of the user device suggesting the user take a break; or (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

An example method implemented in a data processing system includes accessing information about a scheduled meeting of a user, the information including a start time and an end time of the scheduled meeting; determining a planned meeting time for the scheduled meeting based on the accessed information; receiving an attendance signal which indicates that the user has joined the scheduled meeting; monitoring the attendance signal to determine an attended amount of time of the user in the scheduled meeting, wherein the attendance signal represents a user device of the user joining the scheduled meeting; determining an attendance ratio based on the attended amount of time and the planned meeting time for the scheduled meeting; classifying the user as potentially fatigued based on the attendance ratio satisfying a threshold condition; and in response to the user being classified as potentially fatigued, performing a prescribed operation including: (1) causing a message to be displayed on a display of the user device suggesting the user take a break; or (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

An example machine-readable medium on which are stored instructions. The instructions when executed cause a processor of a programmable device to perform operations of accessing information about a scheduled meeting of a user, the information including a start time and an end time of the scheduled meeting; determining a planned meeting time for the scheduled meeting based on the accessed information; receiving an attendance signal indicating that the user has joined the scheduled meeting; monitoring the attendance signal to determine an attended amount of time of the user in the scheduled meeting, wherein the attendance signal represents a user device of the user joining the scheduled meeting; determining an attendance ratio based on the attended amount of time and the planned meeting time for the scheduled meeting; classifying the user as potentially fatigued based on the attendance ratio satisfying a threshold condition; and in response to the user being classified as potentially fatigued, performing a prescribed operation including: (1) causing a message to be displayed on a display of the user device suggesting the user take a break; or (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
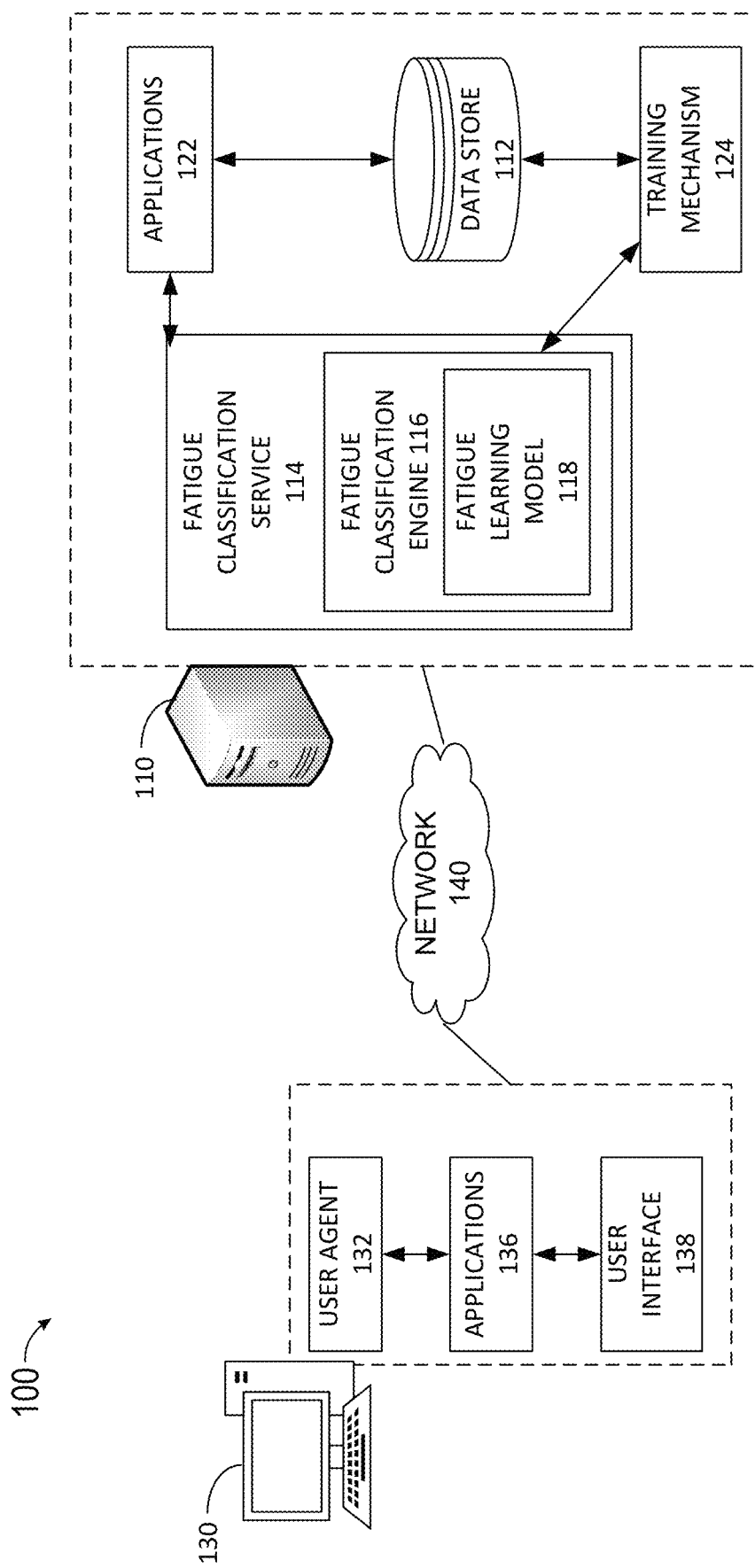
FIG. 1 depicts an example system upon which aspects of this disclosure may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Online meetings allow for users to collaborate with one another, even if the users of the online meetings are in separate locations. Further, online meetings allow for a user to attend a plurality of meetings, without a need to go to a different physical location for each meeting. In this way, online meetings may increase work productivity for a user.

One technical problem which arises in online meetings is user fatigue from attending these online meetings. Potential drawbacks of user fatigue include user exhaustion, a user experiencing a loss of concentration, and reduced user productivity, amongst other potential drawbacks. Currently, a user may be unaware that they are fatigued by attending these online meetings. In this way, a user may be unaware they are experiencing these drawbacks. Accordingly, this user unawareness of fatigue raises another technical problem of computing resources being consumed at a relatively nonoptimal level by the user.

To address these technical problems and more, this description discloses technical solutions for monitoring a user of an online meeting. In embodiments, aspects of the instant application detect user fatigue based on an attendance ratio. As an example, an attendance ratio is determined based on an attended amount of time and a planned meeting time for a scheduled online meeting. In further embodiments, aspects of the instant application utilize captured images of the user during attendance of a scheduled online meeting for further determination of whether a user is potentially fatigued. As an example, aspects of the instant application utilize a neural network to detect that a user is squinting. These technical solutions provided by the instant application allow for a triggering of notifications and/or specific actions in response to a user being potentially fatigued. Accordingly, the technical solutions provided by the instant application limit nonoptimal use of computing resources by notifying a user of potential fatigue.

As a general matter, the methods and systems described herein may include, or otherwise make use of, a machine-trained model to determine whether a user is potentially fatigued by identifying a scheduled online meeting of a user and a planned meeting time for this scheduled online meeting. Further, the methods and systems described herein may include, or otherwise make use of, the machine-trained model to determine an attended amount of time of the user in the scheduled online meeting, and use this determined attended amount of time and the planned meeting time to determine an attendance ratio. In addition, the methods and systems described herein may include, or otherwise make use of, the machine-trained model to determine if a user is potentially fatigued based on the attendance ratio and/or images of the user analyzed by the machine-trained model.

In embodiments, machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to determine whether a user is potentially fatigued. Such determination may be made following the accumulation, review, and/or analysis of online meeting attendance over time, that may be configured to provide the ML algorithm (MLA) with an initial or ongoing set of training data. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate determination of whether a user is potentially fatigued and/or to increase the training data for a future determination of whether a user is potentially fatigued.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a stacked trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a server 110 which may be connected to or include a data store 112 which may function as a repository in which datasets relating to training models, data relating to a fatigue classification service 114 and/or data relating to applications 122 may be stored. Although shown as a single data store, the data store 112 may be representative of multiple storage devices and data stores which may be connected to each of the fatigue classification service 114, applications 122, or fatigue learning model 118. Moreover, the server 110 may include a plurality of servers that work together to deliver the functions and services provided by each service or application. The server 110 may operate as a shared resource server located at an enterprise accessible by various computer client devices such as user device 130. The server 110 may also operate as a cloud-based server for offering fatigue determination services in one or more applications such as applications 122.

The server 110 may include and/or execute the fatigue classification service 114 which may provide fatigue determination utilizing an application on their client devices such as user device 130. The fatigue classification service 114 may operate to obtain meeting information data from the user device 130 via an application (e.g., applications 122 or applications 136), examine the detected meeting information data, and provide a fatigue determination with respect to the user in response to user attendance in a scheduled online meeting.

In embodiments, the fatigue classification service 114 may determine a user is potentially fatigued by utilizing an attendance ratio with respect to scheduled online meetings. Examples of a scheduled online meeting include a virtual meeting deeply rooted in computing technology, with attendees participating in the virtual meeting by utilizing computing resources. In further embodiments, the fatigue classification service 114 may further determine that a user is potentially fatigued by utilizing images of the user during the scheduled online meeting.

In embodiments, the fatigue classification service 114 may utilize a fatigue classification engine 116 which examines meeting information for a scheduled online meeting in order to determine the attendance ratio. To achieve this, the fatigue classification engine 116 may make use of machine learning models, i.e., the fatigue learning model 118, which operates to access meeting information for scheduled online meetings of a user. Examples of accessed meeting information include a start time of a scheduled online meeting and an end time of a scheduled online meeting.

In embodiments, the fatigue classification engine 116 may access the meeting information by accessing an agenda of a user via applications 122 and/or applications 136. Examples of an agenda include a calendar having entries at specific times and dates. Examples of these entries include an agenda entry listing a start time of a scheduled online meeting, an end time of the scheduled online meeting, and/or a list of attendees of the scheduled online meeting.

In embodiments, the fatigue classification service 114 further utilizes the fatigue classification engine 116 to determine a planned meeting time for the scheduled online meeting based on the accessed meeting information. Specifically, the fatigue classification engine 116 uses the fatigue learning model 118, along with the start time and the end time of the scheduled online meeting, to determine the planned meeting time. In embodiments, to determine the planned meeting time, the fatigue classification engine 116 finds a difference of time between the start time and the end time of the scheduled online meeting. As an example, a start time for the scheduled online meeting may be 9:00 am, while the end time is 9:45 am. In this example, the fatigue classification engine 116 takes the difference between the start time and the end time and determines that the planned meeting time is 45 minutes.

The fatigue classification service 114 further utilizes the fatigue classification engine 116 to receive an attendance signal for the scheduled online meeting. In embodiments, the attendance signal represents the user device 130 joining the scheduled online meeting. Specifically, an attendance signal includes a display of a status indicator, with the status indicator representing whether the user is available or is in a scheduled online meeting based on whether the user device of the user logs into a meeting.

Examples of a status indicator include a specific color displayed on an agenda entry listing the scheduled online meeting in the agenda of the user. As a more specific example, a status indicator of the attendance signal is a color change in which the agenda entry changes from a first color displaying a relatively lighter shade to a second color displaying a relatively darker shade. As another specific example, in addition to and/or instead of the color change, the status indicator is a colored radio button next to a name of the user. In this way, an attendance signal is any type of signal which indicates that the user has joined the scheduled online meeting. In some embodiments, the fatigue classification engine 116 receives the attendance signal by accessing the agenda via applications 122 and/or applications 136 and detecting the status indicator in the agenda. Specifically, the fatigue classification engine 116 accesses a state of a status indicator of the user by detecting a color of the status indicator.

In embodiments, the fatigue classification service 114 further utilizes the fatigue classification engine 116 to monitor the attendance signal to determine an attended amount of time of the user in the scheduled online meeting. As an example, the fatigue classification engine 116 monitors the attendance signal via applications 122 and/or applications 136 and determines that a status indicator changes from a second color to a first color. The fatigue classification engine 116 determines an attendance time of the scheduled online meeting in response to the status indicator changing from the second color to the first color.

Using the attendance time, the fatigue classification engine 116 determines an attended amount of time of the user attending the scheduled online meeting. As an example, the fatigue classification engine 116 may determine the attended amount of time by taking a difference between the attendance time and the start time of the scheduled online meeting.

In embodiments, the attended amount of time may be a cumulative amount of time covering a single scheduled online meeting or a plurality of scheduled online meetings that the user attends over a period of time. As an example, the attended amount of time includes an attended amount of time of a first scheduled online meeting the user attends in the morning. During the day, as the user attends further scheduled online meetings, the fatigue classification engine 116 continues to determine attended amounts of time for additional meetings the user attends.

In embodiments, the fatigue classification engine 116 adds these additional attended amounts of time to the original attended amount of time. In this way, the attended amount of time may be a cumulative amount of time covering a plurality of scheduled online meetings that the user attends. Specifically, the fatigue classification engine 116 monitors the attendance signal by accumulating an amount of time the attendance signal is present over a prespecified period of time, with this accumulated attendance signal representing an accumulated attended amount of time in meetings during the prespecified period of time. Accordingly, the fatigue classification engine 116 accumulates an attended amount of time and may also accumulate planned meetings time for the scheduled online meetings during a prespecified period of time. Examples for the prespecified period of time include a day, a plurality of days, a week, weeks, a month, and/or months, depending on the user's needs. In embodiments, the period of time is determined by the user of the user device 130 and/or an administrator of the scheduled online meetings.

In embodiments, the fatigue classification engine 116 uses the attended amount of time, along with the planned meeting time, to determine an attendance ratio of the user. Specifically, the fatigue classification engine 116 determines the attendance ratio by dividing the attended amount of time with the planned meeting time. As an example, the attended amount of time is 35 minutes, while the planned meeting time is 45 minutes. In this example, the fatigue classification engine 116 determines that the attendance ratio is about 0.77 by dividing 35 minutes with 45 minutes. In embodiments in which the fatigue classification engine 116 accumulated an attended amount of time for a plurality of meetings in which the user attended, the fatigue classification engine 116 determines the attendance ratio based on the accumulated attended amount of time and an accumulated planned meetings time for the scheduled online meetings during a pre-specified period of time.

In embodiments, the fatigue classification engine 116 uses the attendance ratio to classify whether the user is potentially fatigued. Specifically, the fatigue classification engine 116 classifies the user as being potentially fatigued in response to the attendance ratio satisfying a threshold condition. In embodiments, a threshold condition may indicate whether a user is potentially fatigued. As an example, the attendance ratio is 0.77, while a threshold condition of greater than 0.8 indicates that a user is potentially fatigued. In this example, since the attendance ratio is less than the threshold condition, the attendance ratio does not satisfy the threshold condition. Accordingly, the fatigue classification engine 116 does not classify the user as being potentially fatigued. In an alternative example, the attendance ratio is 0.87, while a threshold condition of greater than 0.8 indicates that a user is potentially fatigued. In this example, since the attendance ratio is greater than the threshold condition, the fatigue classification engine 116 classifies the user as potentially fatigued based on the attendance ratio satisfying the threshold condition. In embodiments, the period of time is determined by the user of the user device 130 and/or an administrator of the scheduled online meetings.

In addition to or instead of using the attendance ratio and threshold condition to classify the user as being potentially fatigued, the fatigue classification engine 116 may also use images and/or video of the user during attendance of a scheduled online meeting to classify whether the user is potentially fatigued. The fatigue classification engine 116 stores the images, along with the meeting information, e.g., agenda entries, start times, end times, planned meeting times, as meeting information data in the data store 112.

In embodiments, to capture the images and/or video, the fatigue classification engine 116 accesses one or more cameras of the user device 130 via the applications 122 and/or applications 136 to capture images of the user during the scheduled online meeting. In response to capturing the images, the fatigue classification engine 116 analyzes the images using the fatigue learning model 118 to track head movement, eye movement, or both of the user. The fatigue classification engine 116 then uses the head movement, eye movement, or both of the user to determine expressions of the user. In response to determining that certain expressions are present, the fatigue classification engine determines that the user is potentially fatigued and further classifies the user as being potentially fatigued.

In embodiments, the fatigue classification engine 116 uses patterns of movements which indicate fatigue, e.g., yawning, squinting, and closed eyes, amongst other examples. As an example, the fatigue classification engine 116 analyzes the images to determine movements of the user's head and/or eyes. Specifically, the fatigue classification engine 116 uses image processing algorithms, to determine the movements of the user's head and/or eyes.

In embodiments, the fatigue classification engine 116 compares movements of the user's head and/or eyes to patterns of movements which indicate a user being potentially fatigued. As an example, the fatigue classification engine 116 determines that the user's head movements match a pattern of head movements for yawning. In response to this matching pattern, the fatigue classification engine 116 determines the user is yawning and that the user is potentially fatigued. As another example, the fatigue classification engine 116 analyzes the images and determines that the user's eye movements match a pattern of squinting. In response to this matching pattern, the fatigue classification engine 116 determines the user is squinting and that the user is potentially fatigued. In this way, the fatigue classification engine 116 uses images of the user to further determine and/or further classify that the user is potentially fatigued.

In response to classifying the user as being potentially fatigued, the fatigue classification service 114 causes the fatigue classification engine 116 to perform a prescribed operation. In embodiments, a prescribed operation performed by the fatigue classification engine 116 may include causing a message to be displayed on a display of the user device 130, which suggests the user take a break. As an example, the message may include a notification of a "Fatigue Warning," along with an indication of when the user last took a break. As a more specific example, the indication may state that the user took a break about four hours ago.

The message displayed on the user device 130 may also include a personalized message to the user. As a more specific example, the message may state "you should block some time to relax," amongst other types of messages. In this way, the performance of a prescribed action includes causing a message to be displayed on a display of the user device 130 suggesting the user take a break.

In embodiments, the message displayed on the user device 130 may include a radio button that allows a user to schedule the break. The fatigue classification service 114 may display the message through a user interface 138, as an example. Specifically, the fatigue classification service 114 may utilize application 122 and/or application 136 to display the message on the user interface 138.

In response to the user pressing the button, the fatigue classification engine 116 may add an agenda entry in the user's agenda indicating that the user is taking a break. As an example, the agenda entry may display the words "Coffee break" or any other type of message indicating that the user is taking a break.

In addition to or instead of the fatigue classification engine 116 causing a message to be displayed and/or adding an agenda entry in the agenda, the fatigue classification engine 116 may identify a future meeting of the user subsequent to classifying the user as being potentially fatigued. In embodiments, the fatigue classification engine 116 identifies a future meeting by accessing schedule data specifying meeting schedules of the user. Specifically, the fatigue classification engine 116 accesses the schedule data by accessing the agenda of the user. As an example, the fatigue classification engine 116 accesses the schedule data by using applications 122 or applications 136 to access the agenda of the user from the user device 130.

In response to accessing the agenda, the fatigue classification engine 116 uses the fatigue learning model 118, along with language processing techniques, e.g., natural language processing techniques, to identify a future scheduled online meeting of the user. As an example, the language processing techniques detect a word of "meeting" in an agenda entry of the agenda, thereby identifying a future meeting.

In response to identifying a future meeting, the fatigue classification engine 116 sends a message to the user requesting permission to send a message to attendees of the future scheduled online meeting indicating that the user is requesting to reschedule the future scheduled online meeting. In response to receiving permission from the user, the fatigue classification engine 116 sends a message to attendees of the future scheduled online meeting indicating that the user would be late or will not be able to attend the future online meeting. As an example, the fatigue classification engine 116 may display the message of "I'm running late," amongst other types of messages, to the attendees of the future online meeting. In embodiments, the fatigue classification engine 116 may display this message in a messaging application of the scheduled online meeting. In addition to or instead of the fatigue classification engine 116 sending a message to attendees of the future online meeting, the fatigue classification engine 116 may send a request to reschedule or cancel the future meeting. In embodiments, the request message may be sent to the attendees of the future meeting and/or an administrator of the future meeting.

In embodiments, the fatigue classification engine 116 may send these messages to be displayed before a scheduled online meeting begins, during a scheduled online meeting, and/or after a scheduled online meeting ends. To display these messages, the fatigue classification engine 116 may display a message as a pop-up window on the user interface 138 of the user device 130, amongst other examples.

In embodiments, the fatigue classification engine 116 uses machine learning models, i.e., the fatigue learning model 118, to correlate previous instances of a user being potentially fatigued to previous meeting information, including previous attendance ratio values determined from the previous meeting information. As an example, the fatigue classification engine 116 uses machine learning models, i.e., the fatigue learning model 118, to learn a value for an attendance ratio which was present when a user was previously determined to be potentially fatigued. The machine learning models used by the fatigue learning model 118 include a deep learning model, such as a convolutional neural network (CNN), amongst other machine learning models.

In embodiments, as the fatigue learning model 118 learns which attendance ratio values were present when a user was previously classified as being potentially fatigued, the fatigue learning model 118 develops a knowledge base. In this way, the knowledge base includes previous meeting information, including values for attendance ratios which correlate to a user being classified as potentially fatigued. The knowledge base may be stored in the data store 112, as an example.

In embodiments, the fatigue classification engine 116 may use the knowledge base to determine a value for the threshold condition, in addition to or instead of a user and/or an administrator determining the value for the threshold condition. As an example, if the knowledge base contains a value of 0.8 for attendance ratios which correlate to a user being previously classified as potentially fatigued, the fatigue classification engine 116 may set the threshold condition at a value of 0.80. In this example, if an attendance ratio is greater than 0.80, the fatigue classification engine 116 classifies the user as being potentially fatigued.

In embodiments, the fatigue learning model 118 used as part of the fatigue classification service 114 may be trained by a training mechanism 124 such as mechanisms known in the art. The training mechanism 124 may use training datasets stored in the data store 112, including the knowledge base, or at other locations to provide initial and ongoing training for the fatigue learning model 118. In one implementation, the training mechanism 124 may use the previous meeting information from the knowledge base in the data store 112 to train fatigue learning model 118 via deep neural networks. In this way, the training data includes start times, ends times, planned meeting times, and attendance ratio values, for scheduled online meetings in which the user was previously classified as being potentially fatigued. In embodiments, the initial training may be performed in an offline stage.

In embodiments, the data store 112 may also include testing sets for testing the fatigue learning model 118 after it has been trained to ensure accuracy of the fatigue learning model 118. In one implementation, the types of data used for the sets of training data to train the fatigue learning model 118 may be different from the types of data used in the sets of testing data for testing the fatigue learning model 118. In an example, the attendance ratio values are used for training data and development of the fatigue learning model 118, while previous threshold condition values are utilized to evaluate accuracy of the fatigue learning model 118.

In embodiments, the user device 130 may be connected to the server 110 via a network 140. The network 140 may be a wired or wireless network(s) or a combination of wired and wireless networks that connect one or more elements of the system 100. The user device 130 may be a personal or handheld computing device having or being connected to input/output elements that enable a user to interact with various applications (e.g., applications 122 or applications 136). Examples of suitable client devices for user device 130 include but are not limited to personal computers, desktop computers, laptop computers, mobile telephones; smart phones; tablets; phablets; smart watches; wearable computers; gaming devices/computers; televisions; and the like. The internal hardware structure of a client device, e.g., user device 130, is discussed in greater detail in regard to FIGS. 7 and 8.

The user device 130 may include one or more applications 136. Each application 136 may be a computer program executed on the user device 130 that configures the device to be responsive to user input to allow the fatigue classification service 114 to access meeting information and/or capture images of the user via the application 136. Examples of suitable applications include, but are not limited to, a productivity application (e.g., job searching application that provides a job interview coach or a training application that trains employees such as customer service staff on responding to customers, etc.), a presentation application (e.g., Microsoft PowerPoint), a document editing application, a communications application or a standalone application designed specifically for detecting changes to the infrastructure components 150.

In some examples, applications used to access meeting information and/or capture images of the user may be executed on the server 110 (e.g., applications 122) and be provided via an online service. In one implementation, web applications may communicate via the network 140 with the user agent 132, such as a browser, executing on the user device 130. The user agent 132 may provide a user interface 138 that allows the user to interact with applications 122 and may enable applications 122 to provide meeting information and/or images of the user to the fatigue classification service 114 for processing. In other examples, applications used to access meeting information and/or capture images of the user may be local applications such as the applications 136 that are stored and executed on the user device 130 and provide the user interface 138 that allows the user to interact with the application, e.g., applications 122. Infrastructure change data from applications 136 may also be provided via the network 140 to the fatigue classification service 114 for use in detecting changes to infrastructure components 150. In even further examples, the fatigue classification service 114 may be applied directly on a device, e.g., user device 130.

Figure 2:
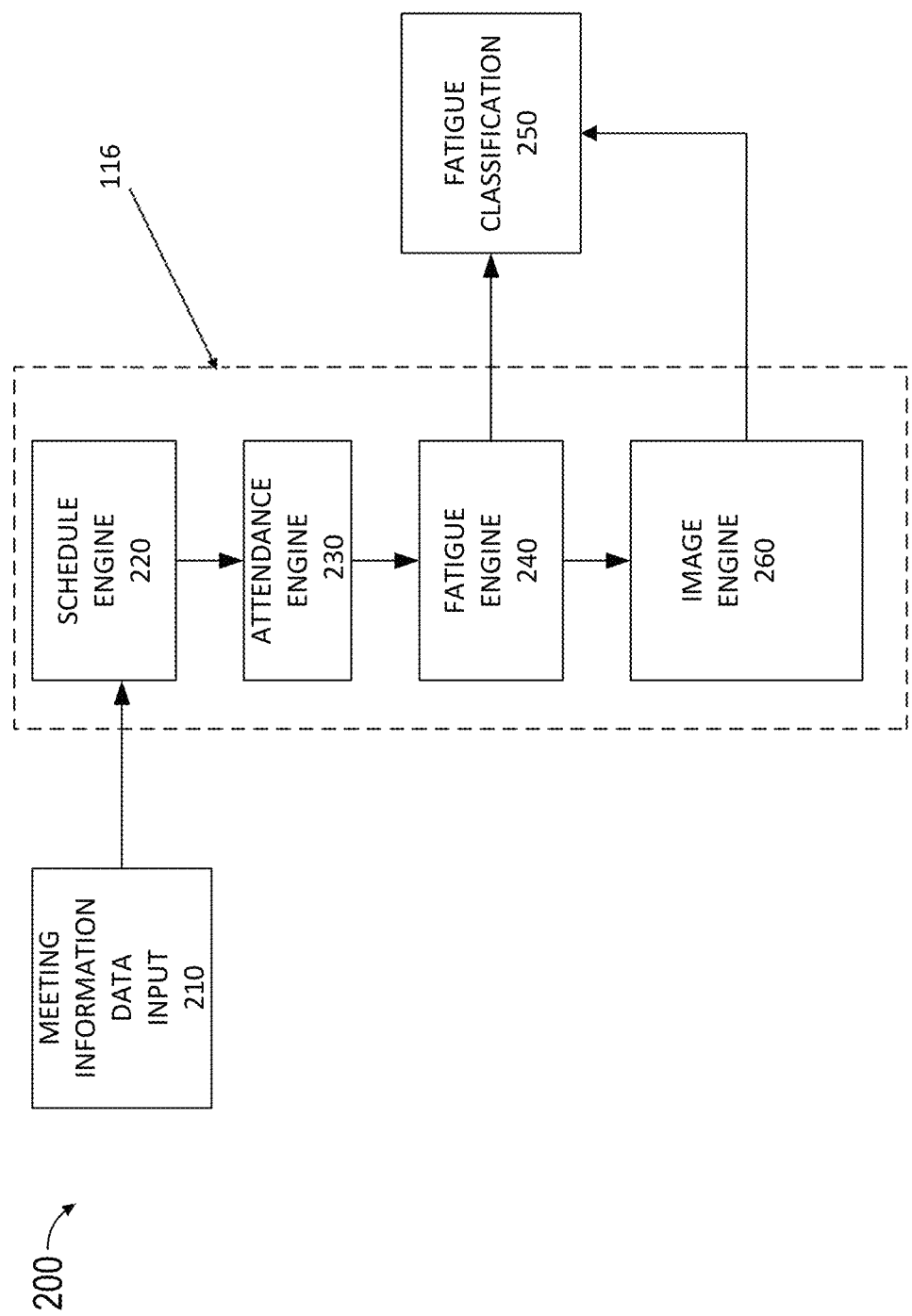
FIG. 2 depicts a simplified architecture for operations of monitoring a user attending a scheduled online meeting.

FIG. 2 depicts a simplified architecture 200 for use by the fatigue classification engine 116 to develop fatigue learning model 118 for classifying whether a user is potentially fatigued. Architecture 200 may include meeting information data input 210 which may be received from the user device 130. In embodiments, the meeting information data input 210 includes the user agenda and captured images of the user, amongst other data.

In embodiments, in response to the fatigue classification service 114 receiving the meeting information data input 210 and the fatigue classification engine 116 receiving the meeting information data input 210, the fatigue classification engine 116 implements a schedule engine 220. Specifically, the schedule engine 220 uses the neural network of the fatigue learning model to determine a planned meeting time for a scheduled online meeting using the start time and the end time found within the meeting information data input 210 for that scheduled online meeting.

In embodiments, in response to determining the planned meeting time from the meeting information data input 210, the fatigue classification engine 116 implements an attendance engine 230. Specifically, the attendance engine 230 receives an attendance signal, which includes a status indicator indicates that the user has joined the scheduled online meeting. As an example, the attendance engine 230 receives an attendance signal by detecting a status indicator in an agenda entry of the user's agenda. In embodiments, the status indicator is displayed as a color in the agenda entry which different than a color of other agenda entries found within the user agenda. As an example, the attendance engine 230 detects the status indicator by detecting that a color of an agenda entry changes from a first color to a second color which has relatively darker shading compared to the first color.

In response to receiving the attendance signal, the attendance engine 230 monitors the attendance signal to determine an attended amount of time of the user in the scheduled online meeting. As an example, the attendance engine 230 monitors the attendance signal and determines that a color of the agenda entry listing the scheduled online meeting changes from the second color to the first color, i.e., a change in the status indicator. In response to determining this status indicator change, the attendance engine 230 determines that the user is no longer attending the scheduled online meeting and determines an attendance time of the scheduled online meeting.

In embodiments, in response to determining the attendance time, the attendance engine 230 determines an attended amount of time. Specifically, the attendance engine 230 determines the attended amount of time by taking a difference between the attendance time and the start time of the scheduled online meeting. In response to determining the attended amount of time, the attendance engine 230 determines an attendance ratio. Specifically, the attendance engine 230 determines the attendance ratio by dividing the attended amount of time with the planned meeting time.

In embodiments, in response to determining the attendance ratio, the fatigue classification engine 116 implements a fatigue engine 240 to determine a fatigue classification 250 of the user. Specifically, the fatigue engine 240 compares the attendance ratio to a threshold condition. In response to the attendance ratio satisfying the threshold condition, i.e., exceeding the threshold condition, the fatigue engine 250 classifies the user as being potentially fatigued as the fatigue classification 250. Alternatively, if the attendance ratio does not satisfy the threshold condition, i.e., lower than the threshold condition, the fatigue engine classifies a user as not being potentially fatigued as the fatigue classification 250.

In addition to and/or instead of using engines 220, 230, 240, the fatigue classification engine 116 implements an image engine 260 to further classify the user as being potentially fatigued. In embodiments, the image engine 260 analyzes captured images within the meeting information data input 210 to further classify the user as being potentially fatigued. Specifically, the image engine 260 uses head movement, eye movement, or both of the user to detect expressions of the user. In embodiments, the image engine 260 uses the detected expressions to determine that the user is potentially fatigued and/or to further classify that the user is potentially fatigued. In response to head movements and/or eye movements matching patterns for movements which indicate fatigue, e.g., yawning, the image engine 260 determines that the user is displaying expressions which indicate potential fatigue. In response to detecting these expressions, the image engine 260 determines that the user is potentially fatigued and further classifies the user as potentially fatigued for the feature classification 250.

Figure 3:
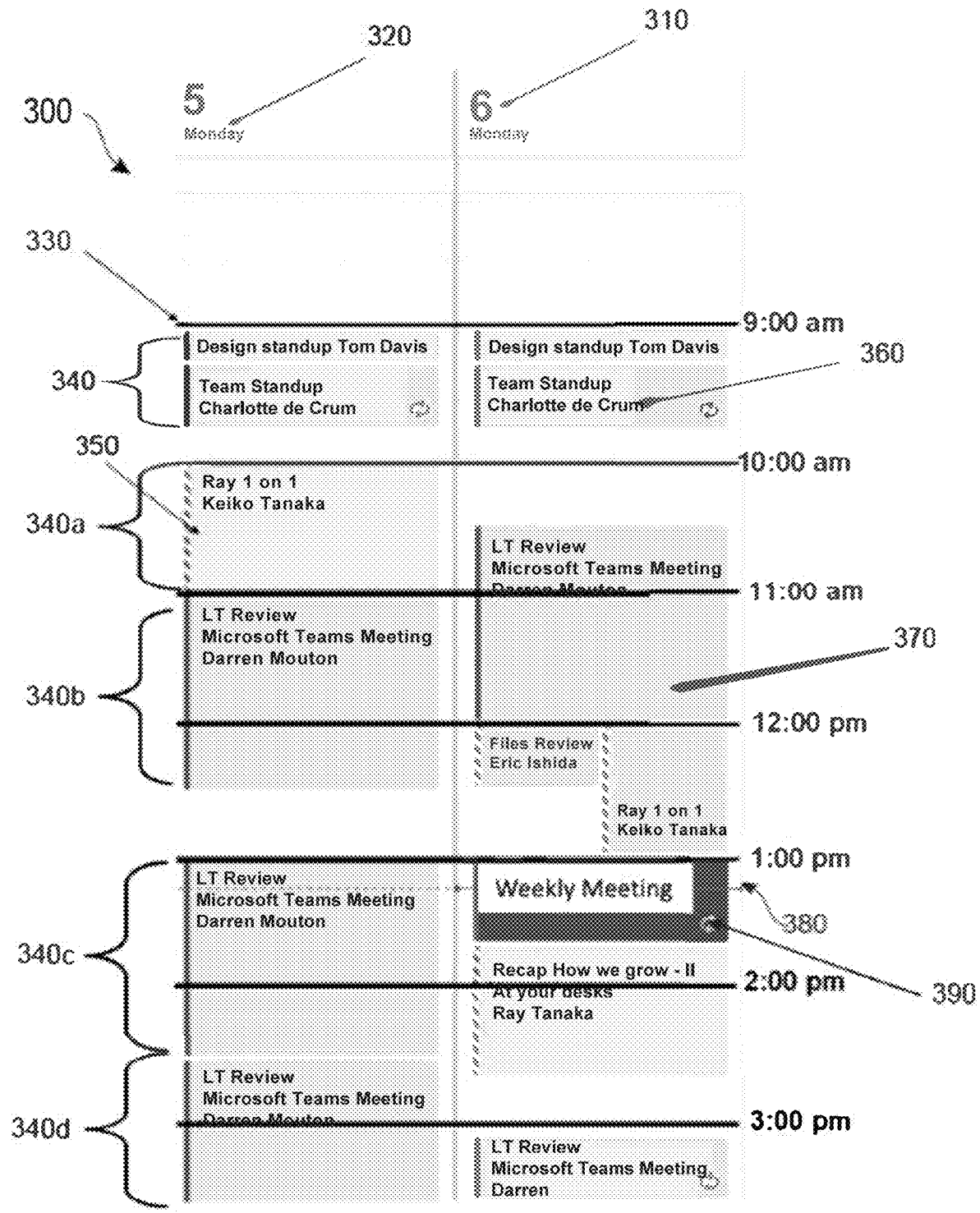
FIG. 3 depicts an agenda of a user.

FIG. 3 an agenda 300 of a user. As shown in FIG. 3, the agenda 300 includes a date 310, a day 320, and times 330. Further, the agenda 300 includes a plurality of agenda entries 340-340*d*. In embodiments, each agenda entry of the agenda entries 340-340*d* includes a scheduled online meeting 350. Examples of the scheduled online meeting 350 include a virtual meeting through a media platform, amongst other examples of online meetings.

As shown in FIG. 3, the times 330 allow for a start time and an end time of the scheduled online meeting 350 to be determined. As an example, agenda entry 340*a* shows that the scheduled online meeting 350 has a start time at 9 am and an end time at 10 am. In embodiments, each agenda entry of the agenda entries 340-340*d* includes a list of attendees 360 who are scheduled to attend scheduled online meeting 350.

An attendance signal 380 indicates that the user has joined the scheduled online meeting 350. In embodiments, the attendance signal 380 represents a user device 130 of the user has joined the scheduled online meeting 350. Specifically, the attendance signal 380 is generated in response to a processor of the fatigue classification service 114 receiving the attendance signal 380 from the user device 130. More specifically, the attendance signal 380 is generated in response to the user interacting with a user interface 138 displayed on the user device 130 join the scheduled online meeting 350.

As shown in FIG. 3, the attendance signal 380 includes a status indicator 390, which is displayed as a different color compared to a first color 370 of an agenda entry of the agenda entries 340-340*d*. In embodiments, the status indicator 390 represents the user is available or is in a scheduled online meeting based on whether the user device 130 of the user logs into a scheduled online meeting.

In embodiments, the fatigue classification engine 116 accesses the agenda 300 via applications 122 and/or applications 136, and examines the agenda 300 for meeting information, e.g., times 330, list of participants 360, etc. To obtain the meeting information, the fatigue classification engine 116 may make use of the fatigue learning model 118. In response to obtaining the meeting information from the agenda 300, the fatigue classification engine 116 determines a planned meeting time for a scheduled online meeting 350 based on the accessed meeting information. Specifically, the fatigue classification engine 116 uses the fatigue learning model 118, along with the start time and the end time of the scheduled online meeting 350, to determine the planned meeting time.

In addition to determining the planned meeting time, the fatigue classification engine 116 receives the attendance signal 380 for the scheduled online meeting 350. In embodiments, the fatigue classification engine 116 receives the attendance signal 380 by detecting a status indicator 390, with the status indicator 390 causing an agenda entry listing the scheduled online meeting 350 to be a different color than a first color 370.

In embodiments, the fatigue classification engine 116 monitors the attendance signal 380 to determine an attended amount of time of the user in the scheduled online meeting 350. As an example, the fatigue classification engine 116 monitors the attendance signal via applications 122 and/or applications 136 and determines that the status indicator 390 changes from a second color to the first color 370. In embodiments, the fatigue classification engine 116 determines an attendance time of the scheduled online meeting in response to the status indicator 390 changing from the second color to the first color 370.

Using the attendance time, the fatigue classification engine 116 determines an attended amount of time of the user attending the scheduled online meeting 350. As an example, the fatigue classification engine 116 determines the attended amount of time by taking a difference between the attendance time and the start time of the scheduled online meeting 350.

In response to determining the attended amount of time, the fatigue classification engine 116 determines an attendance ratio by dividing the attended amount of time with the planned meeting time. The fatigue classification engine 116 then uses the attendance ratio to classify whether the user is potentially fatigued. Specifically, the fatigue classification engine 116 classifies the user as being potentially fatigued in response to the attendance ratio satisfying a threshold condition. As an example, the attendance ratio is 0.87, while a threshold condition of greater than 0.8 indicates that a user is potentially fatigued. In this example, since the attendance ratio is greater than the threshold condition, the fatigue classification engine 116 classifies the user as potentially fatigued for the fatigue classification 250 based on the attendance ratio satisfying the threshold condition.

Figure 4:
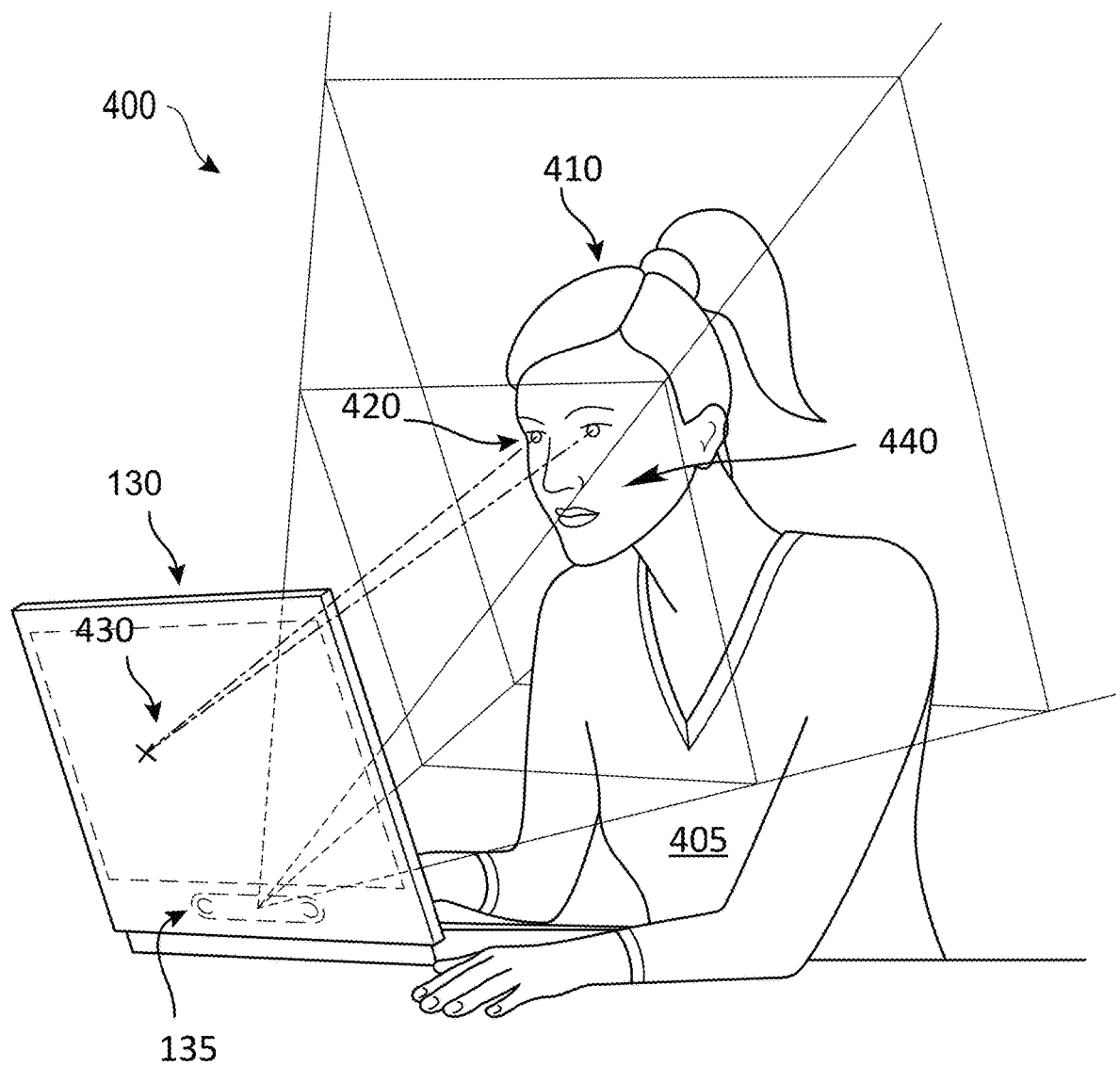
FIG. 4 is an example of capturing images and/or video for detecting expressions of a user who is attending a scheduled online meeting.

FIG. 4 depicts capturing images and/or video 400 for detecting expressions of a user 405 who is attending a scheduled online meeting 350. In addition to the attendance ratio satisfying a threshold condition, the fatigue classification engine 116 uses the detected expressions to further determine and/or further classify a user 405 as being potentially fatigued for the fatigue classification 250.

As shown in FIG. 4, the user device 130 includes one or more cameras 135 which capture images and/or video 400 of the user 405 while the user 405 attends a scheduled online meeting. More specifically, the images and/or video 400 capture movements of the user's head 410. Examples of movements of the user's head 410 which are captured in the images and/or video 400 include the user's head 410 tilting to a specific side of the user 405.

In embodiments, the images and/or video 400 also capture movements of the user's eyes 420. Examples of movements of the user's eyes 420 which are captured in the images and/or video 400 include the user's eyes 420 squinting or being closed, amongst other examples of eye movements. In embodiments, the images and/or video 300 also capture fixation points of the user's eyes 420, which establish a user's gaze 430.

In response to receiving the images and/or video 400, the fatigue classification engine 116 analyzes the images and/or video 400 to detect expressions 440 of the user 405. In embodiments, the fatigue classification engine 116 uses image processing algorithms to determine the movements of the user's head 410 and/or user's eyes 420. As an example, the fatigue classification engine 116 determines from the images and/or video 400 that movements of the user's head 410 match a pattern of head movements for a yawning expression. In response to this matching pattern, the fatigue classification engine 116 determines the user 405 is yawning and that the user is potentially fatigued. Accordingly, the fatigue classification engine 116 classifies the user 405 as potentially fatigued for the fatigue classification 250.

Figure 5A:
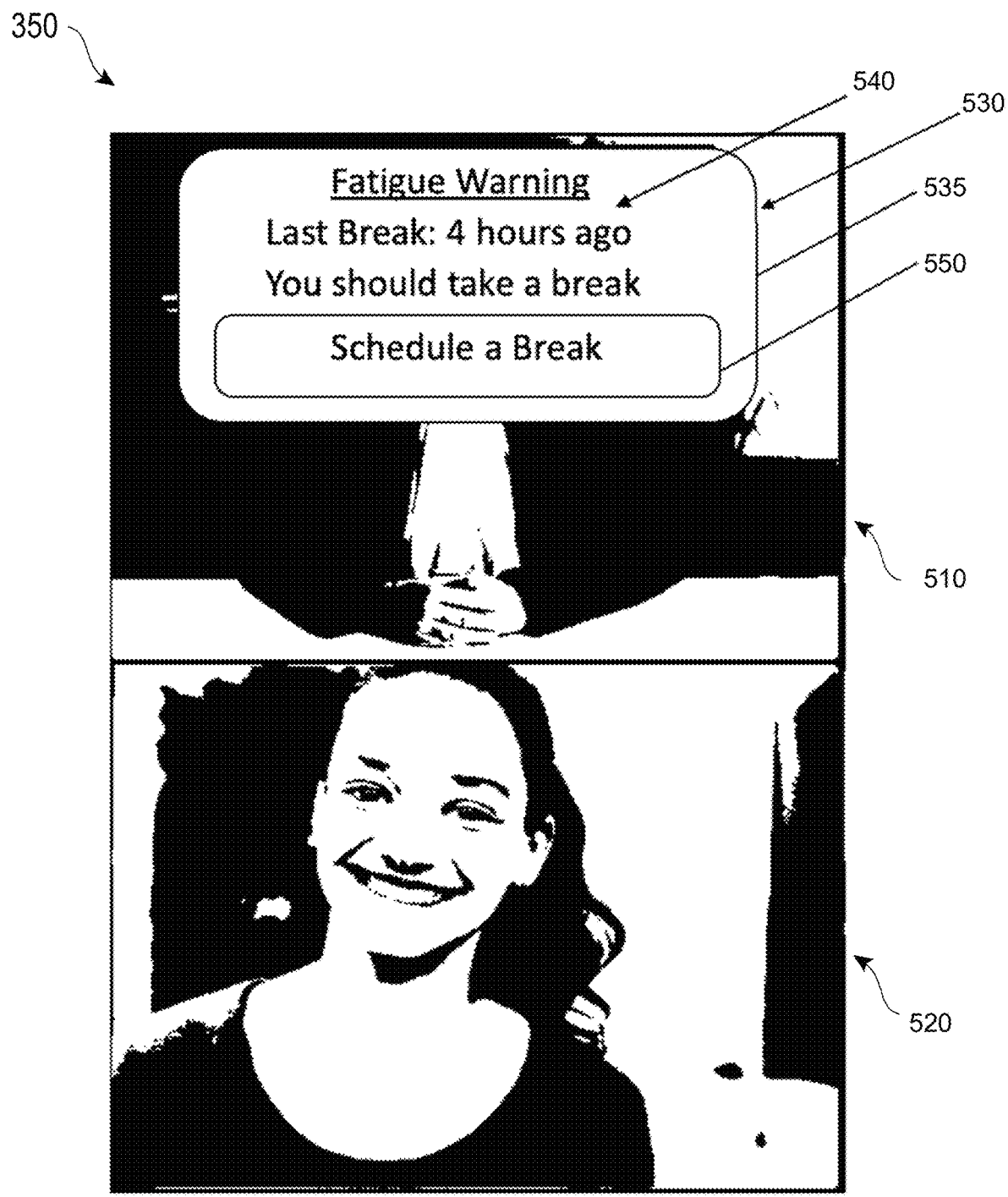
FIGS. 5A-5D depict performing a prescribed operation for a potentially fatigued user.

FIGS. 5A-5D depict performing a prescribed operation during a scheduled online meeting 350 in response to a user 405 being classified as a potentially fatigued. As shown in FIG. 5A, the user 405 is attending a scheduled online meeting 350 with attendees 510, 520. During the scheduled online meeting 350, the fatigue classification service 114 determines the user 405 is potentially fatigued in response to the fatigue classification engine 116 classifying the user 405 as being potentially fatigued. In embodiments, the fatigue classification engine 116 classifies the user 405 as being potentially fatigued in response to an attendance ratio satisfying a threshold condition and/or detecting expressions 440 which indicate that the user 405 is potentially fatigued.

In response to the user 405 being classified as potentially fatigued, the fatigue classification service 114 performs at least one prescribed operation of the operations 530, 560, 570, 570a. In embodiments, the fatigue classification service 114 performs a message operation 530 which displays a message 535. As shown in FIG. 5A, the message 535 includes information 540. The information 540 includes a fatigue warning, a break suggestion, and a last time the user 405 took a break, amongst other examples of information. In this way, fatigue classification service 114 causes a message 535 to be displayed on a display of the user device 130 suggesting the user 405 take a break. As a specifically example, the message 535 may be displayed on through the user interface 138. In embodiments, the message 535 may also include a radio button 550, which allows the user 405 to take a break from the scheduled online meeting 350 and/or a future scheduled online meeting 350a.

In response to the user 405 pressing the radio button 550, the fatigue classification service 114 identifies a future scheduled online meeting 350a of the user 405. Specifically, the fatigue classification engine 116 examines meeting information from the agenda entry 340e to identify the future scheduled online meeting 350a. In this way, the fatigue classification service 114 identifies a future schedule online meeting 350a of the user 405 subsequent to the classifying by accessing schedule data specifying meeting schedules of the user.

Figure 5B:
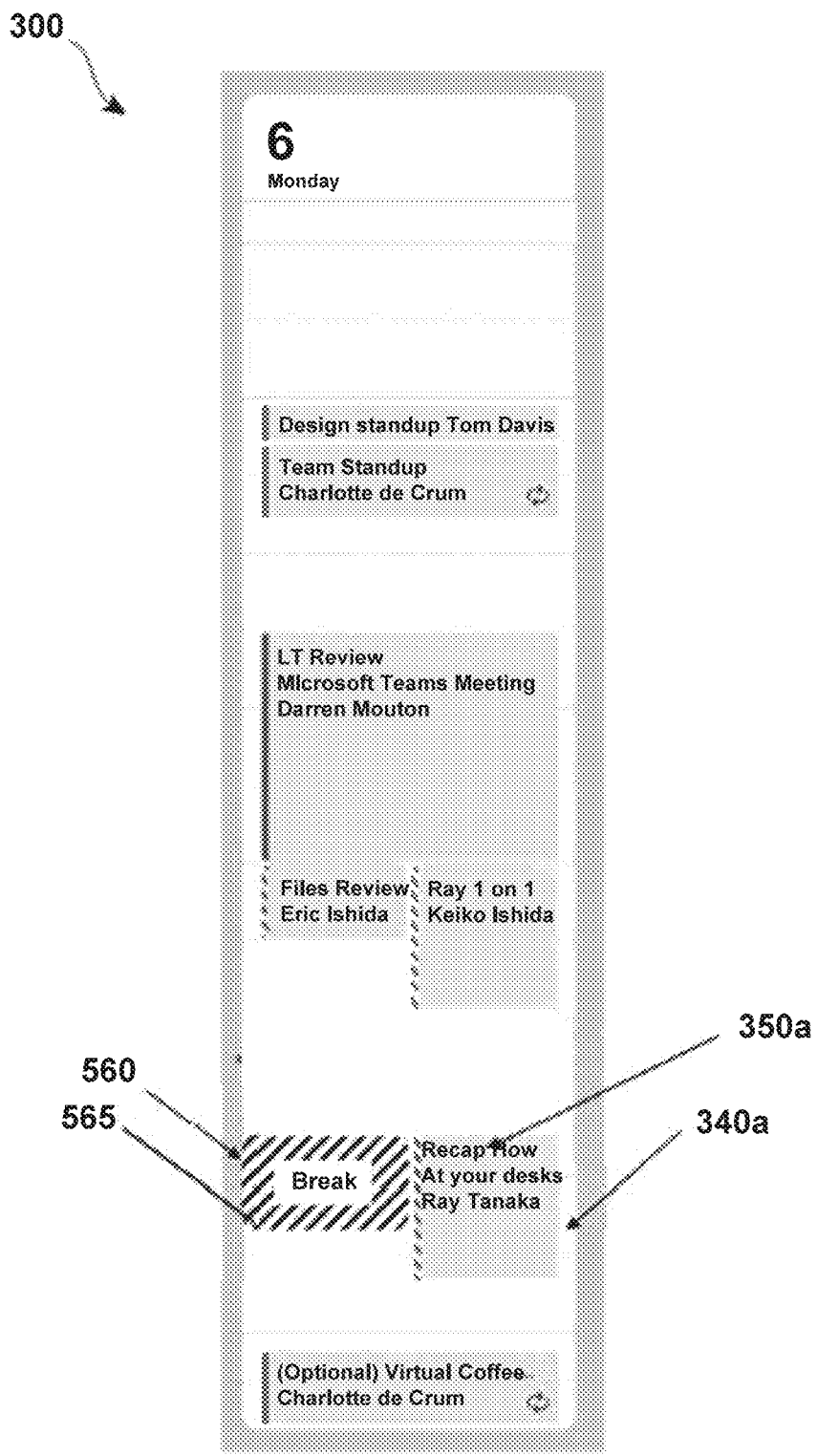

In addition to identifying a future scheduled online meeting 350a, the fatigue classification service 114 performs an agenda entry operation 560 in response to the user 405 pressing the radio button 550. In embodiments, the entry operation 560 includes adding a break entry 565 in the agenda 300, which indicates to viewers of the agenda 300 that the user 405 is taking a break. As shown in FIG. 5B, the break entry 565 may have a specific type of color and/or shading to differentiate from other agenda entries in the agenda 300.

Figure 5C:
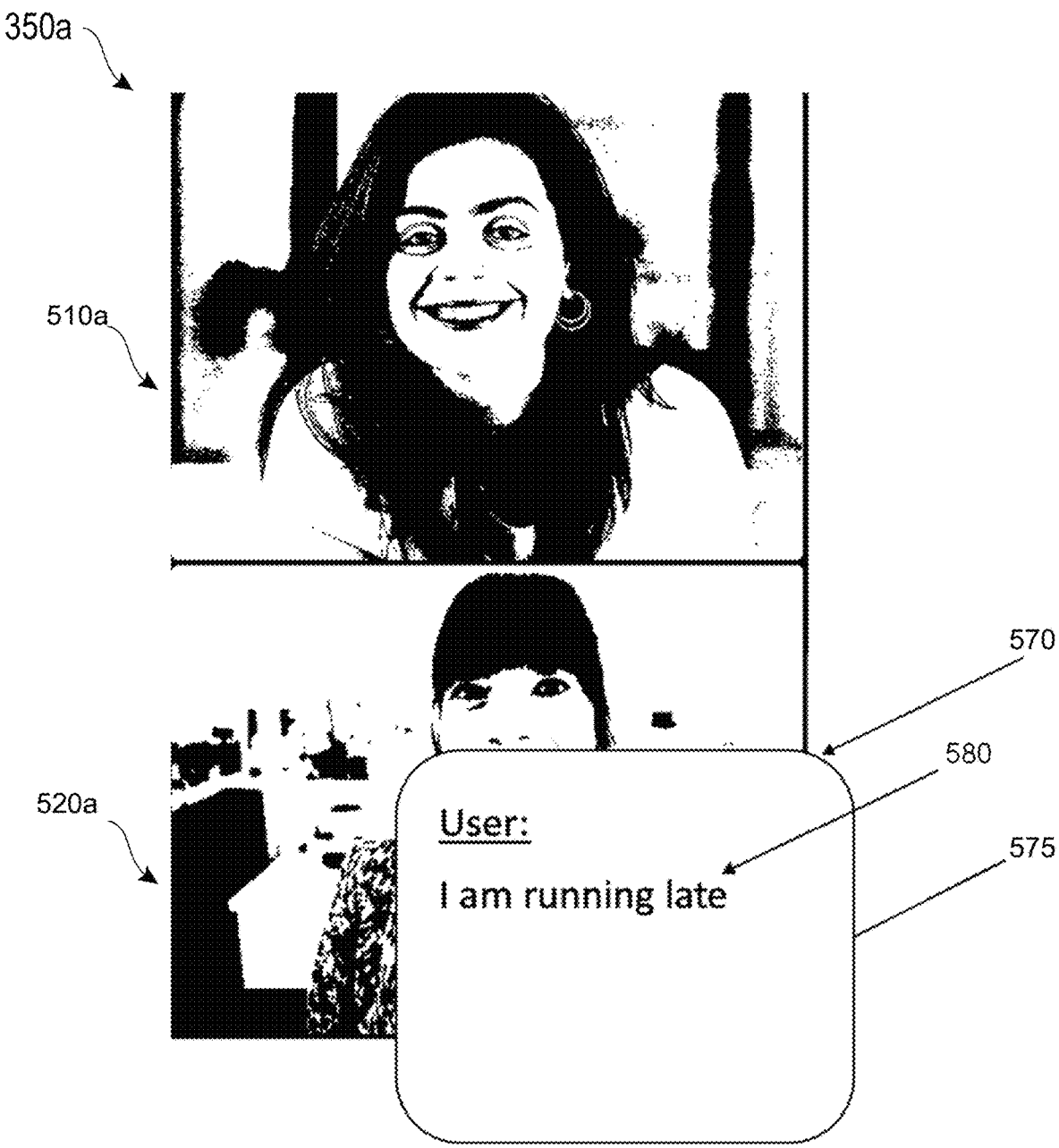
Figure 5D:
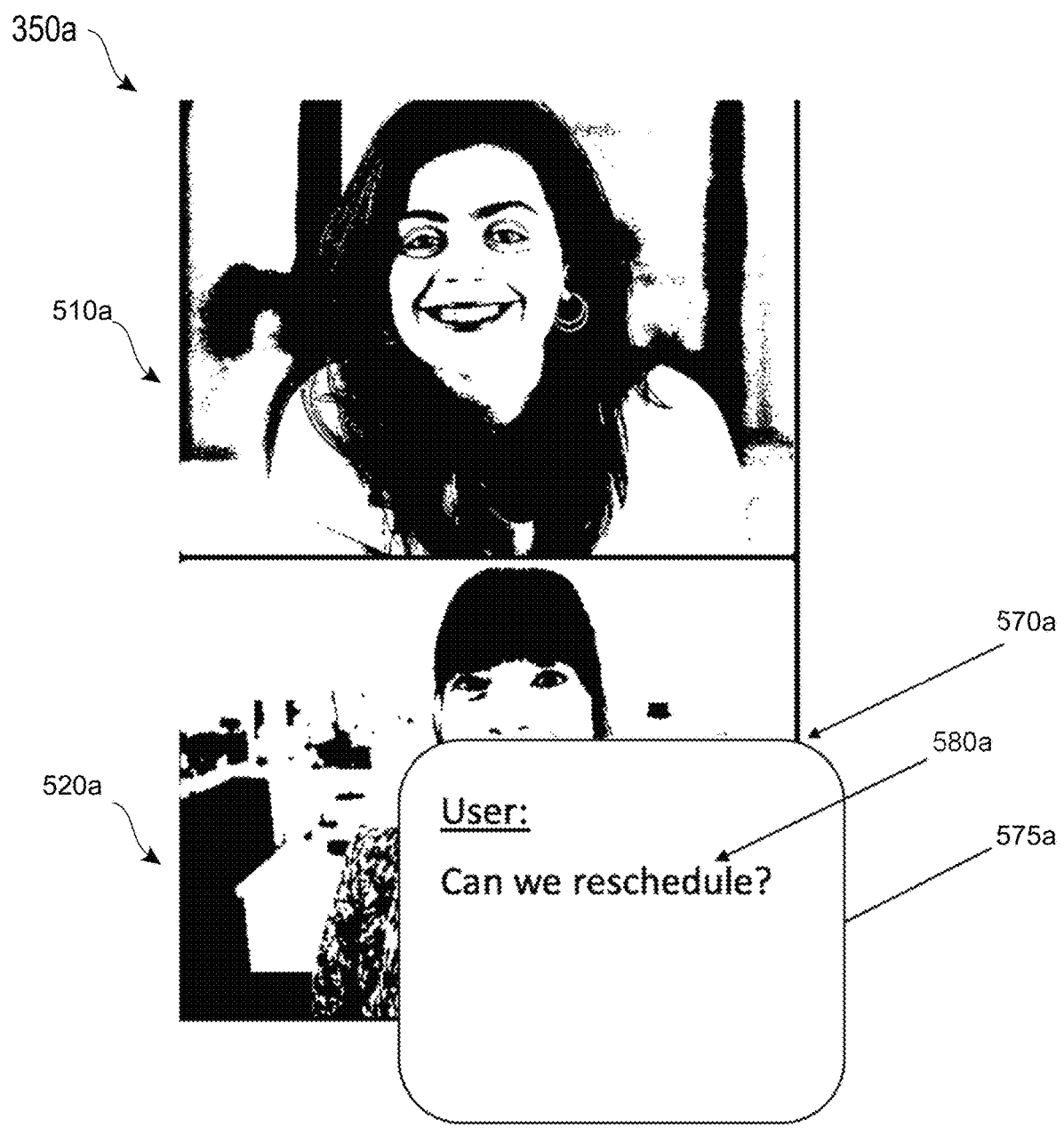

Referring to FIGS. 5C and 5D, the fatigue classification service 114 performs at least one message operation of the message operations 570, 570a in response to the user 405 taking a break. As shown in FIG. 5C, the message operation 570 includes sending a message 575 to attendees 510a, 520a of the future scheduled online meeting 350a. In embodiments, the message 575 includes information 580 that the user 405 would be late or will not be able to attend the future scheduled online meeting 350a. In this way, the fatigue classification service 114 sends a message 575 to attendees 510a, 520a of the future schedule online meeting 350a indicating that the user 405 would be late or will not be able to attend.

In addition to or instead of performing the message operation 570, the fatigue classification service 114 performs the message operation 570a in response to the user 405 taking a break. In embodiments, the message operation 570a includes sending a message 575a to attendees 510a, 520a of the future scheduled online meeting 350a. In embodiments, the message 575a includes information 580a that the user 405 requests to reschedule or cancel the future schedule online meeting 350a. In this way, the fatigue classification service 114 sends a message 575a to attendees 510a, 520a of the future schedule online meeting 350a to reschedule or cancel the future schedule online meeting 350a.

Figure 6:
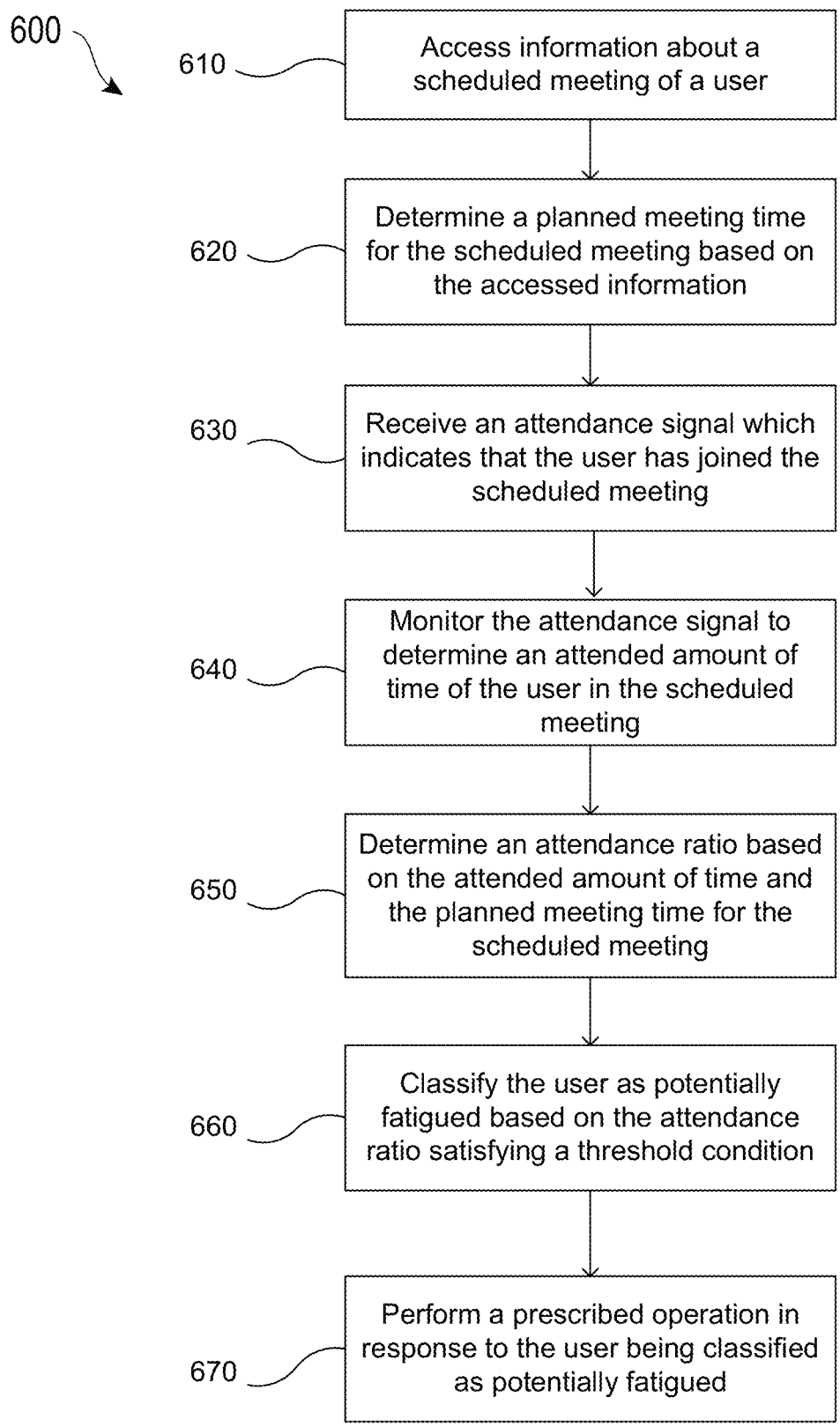
FIG. 6 is a flow diagram of a process for classifying whether a user is potentially fatigued.

FIG. 6 is a flow diagram of a process 600 for classifying whether a user 405 is potentially fatigued. With reference to FIGS. 1-5D, at step 610, the fatigue classification service 114 accesses information about a scheduled meeting of a user, the information including a start time and an end time of the scheduled meeting. In embodiments, the fatigue classification service 114 accesses information about a scheduled online meeting 350 of a user 405 by accessing an agenda 300 and examining agenda entries 340-340d.

At step 620, the fatigue classification service 114 determines a planned meeting time for the scheduled meeting based on the accessed information. In embodiments, the fatigue classification service 114 determines a planned meeting time for the scheduled online meeting 350 based on the accessed information by finding a difference of time between a start time and an end time of the scheduled online meeting 350.

At step 630, the fatigue classification service 114 receives an attendance signal 380 which indicates that the user 405 has joined the scheduled meeting. In embodiments, the fatigue classification service 114 receives the attendance signal 380 by accessing the agenda 300 via applications 122 and/or applications 136. Specifically, the fatigue classification service 114 detecting a status indicator 390 in the agenda 300.

At step 640, the fatigue classification service 114 monitors the attendance signal 380 to determine an attended amount of time of the user 405 in the scheduled meeting. In embodiments, the fatigue classification service 114 monitors the attendance signal 380 via applications 122 and/or applications 136 and determines an attendance time of the scheduled online meeting 350 in response to the status indicator 390 changing from the second color to the first color 370. Using the attendance time, the fatigue classification engine 116 determines an attended amount of time of the user 405 attending the scheduled online meeting 350 by taking a difference between the attendance time and the start time of the scheduled online meeting 350.

At step 650, the fatigue classification service 114 determines an attendance ratio based on the attended amount of time and the planned meeting time for the scheduled meeting. In embodiments, the fatigue classification service 114 determines an attendance ratio by dividing the attended amount of time with the planned meeting time.

At step 660, the fatigue classification service 114 classifies the user 405 as potentially fatigued based on the attendance ratio satisfying a threshold condition. In embodiments, the fatigue classification service 114 compares the attendance ratio to the threshold condition. If the attendance ratio is greater than the threshold condition, than the attendance ration satisfies the threshold condition and the user is classified as being potentially fatigued for the fatigue classification 250.

At step 670, the fatigue classification service 114 performs a prescribed operation in response to the user 405 being classified as potentially fatigue. In embodiments, the fatigue classification service 114 performs at least one prescribed operation of the operations 530, 560, 570, 570a. As an example, the fatigue classification service 114 may perform the message operation 530, which causes a message 535 to be displayed on a display of the user device 130 suggesting the user 405 take a break.

Figure 7:
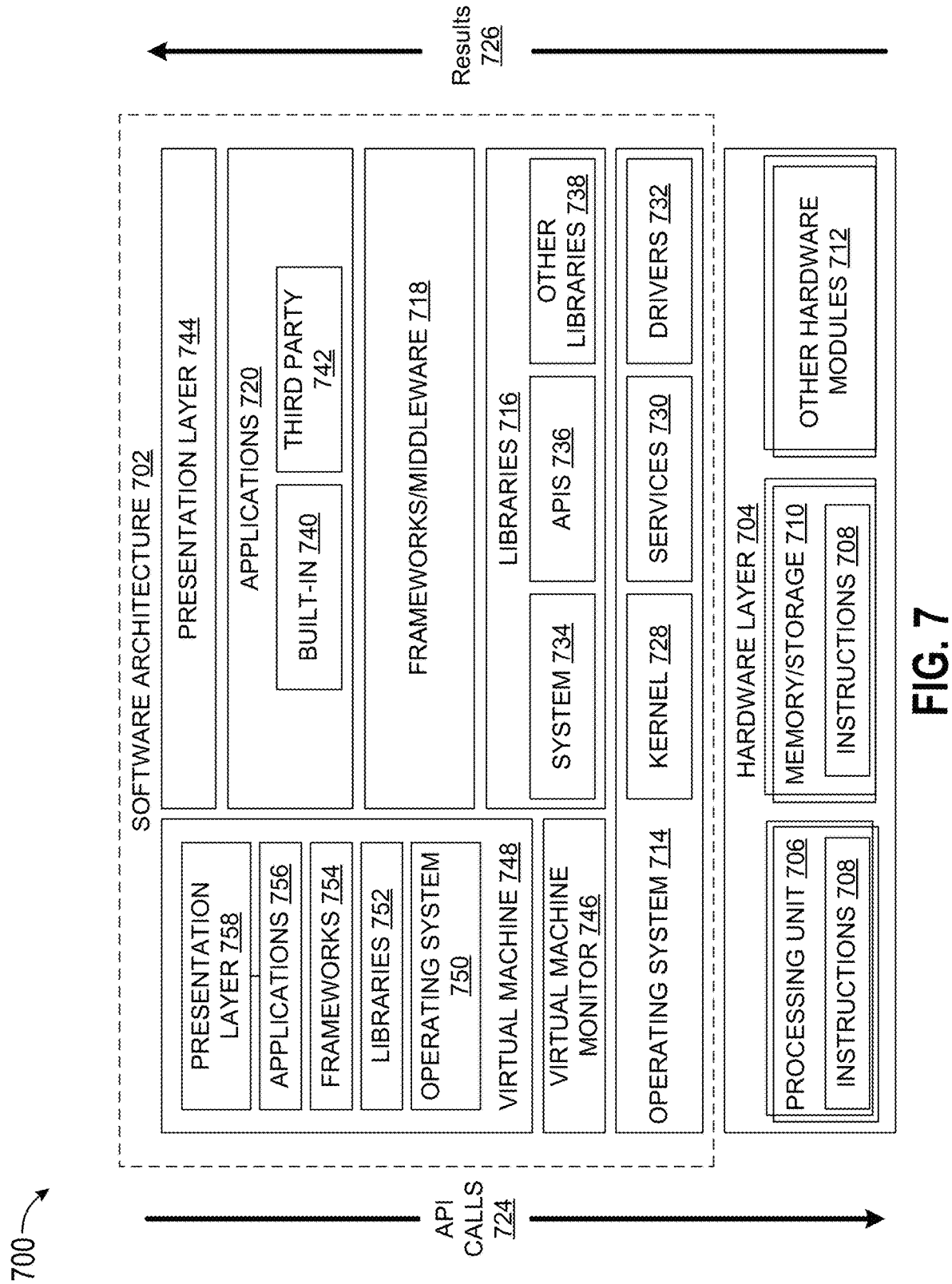
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 724. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 720 and/or third-party applications 742. Examples of built-in applications 70 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 728. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
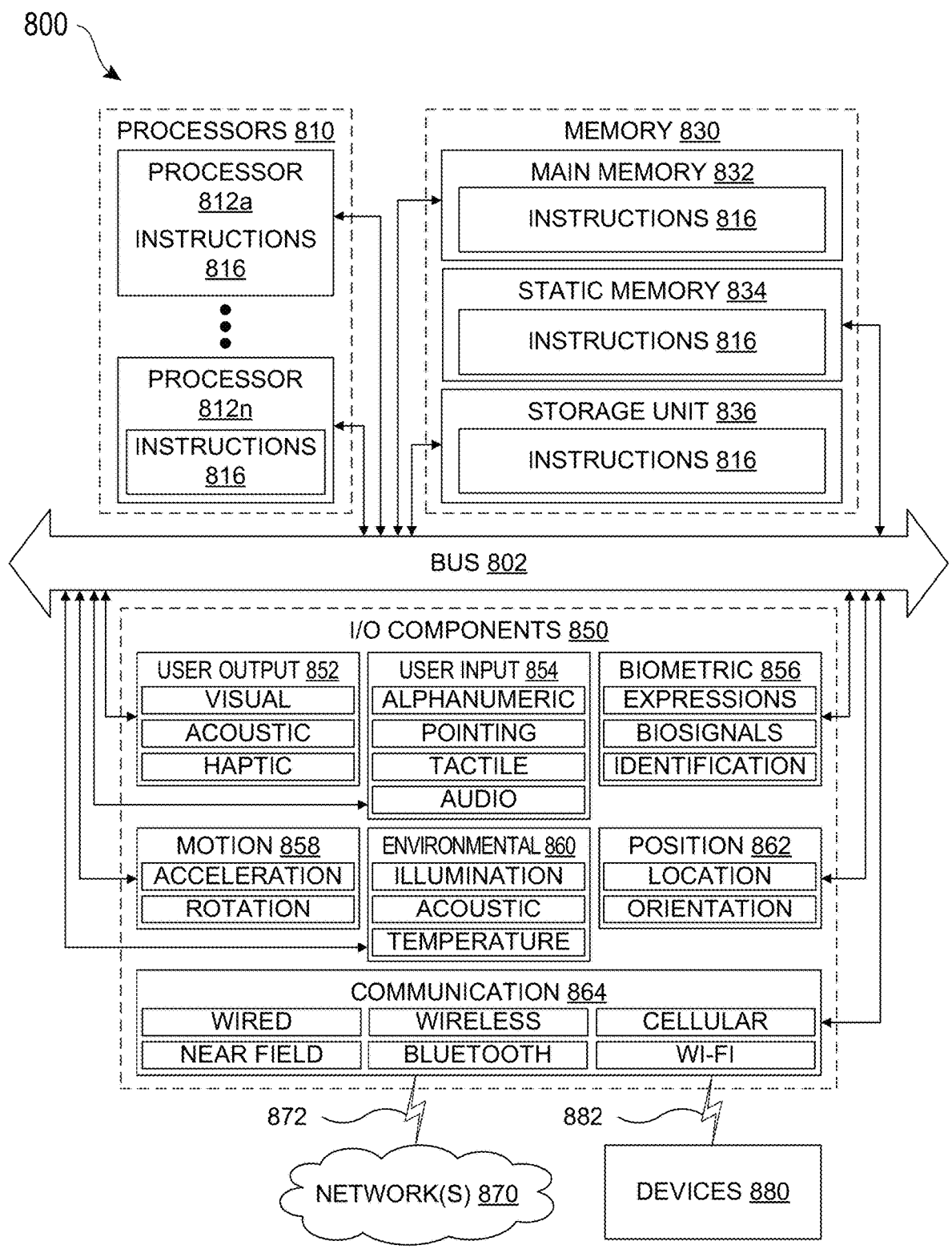
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

In further examples, the I/O components 850 may include motion components 858, which may include acceleration and/or rotation sensors. In embodiments, the I/O components 850 may include environmental components 860, which may include illumination, acoustic, and/or temperature sensors. In further embodiments, the I/O components 850 may include position components 860, which may include location and/or orientation sensors.

The I/O components 850 may also include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

Devices and methods for root cause detection of a service outage for a cloud service are described. Devices can include a data processing system which includes processor, and a memory in communication with the processor, the memory comprising executable instructions that, when executed by the processor, cause the data processing system to perform various functions. The functions may include detecting changes to infrastructure components, extracting metadata associated with the changes, grouping the changes based on the metadata, ranking the groups of changes based on past incidents of service outages, and displaying the ranked groups of changes to a user.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims. Generally, functions described herein (for example, the features illustrated in FIGS. 1-8) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the instant application will be described by means of items:

Item 1. A data processing system comprising:
a processor; and
a machine-readable storage medium storing executable instructions that, when executed, cause the processor to perform operations comprising:
  accessing information about a scheduled meeting of a user, the information including a start time and an end time of the scheduled meeting;
  determining a planned meeting time for the scheduled meeting based on the accessed information;
  receiving an attendance signal which indicates that the user has joined the scheduled meeting;
  monitoring the attendance signal to determine an attended amount of time of the user in the scheduled meeting, wherein the attendance signal represents a user device of the user joining the scheduled meeting;
  determining an attendance ratio based on the attended amount of time and the planned meeting time for the scheduled meeting;
  classifying the user as potentially fatigued based on the attendance ratio satisfying a threshold condition; and
  in response to the user being classified as potentially fatigued, performing a prescribed operation including:
    (1) causing a message to be displayed on a display of the user device suggesting the user take a break; or
    (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

Item 2. The data processing system of item 1, wherein the accessing the information includes accessing an agenda of the user.

Item 3. The data processing system of any one of items 1-2, wherein to monitor the attendance signal, the machine-readable storage medium further includes instructions configured to cause the processor to perform operations of:
  accessing a state of a status indicator of the user, the status indicator representing whether the user is available or is in a meeting based on whether the user device of the user logs into a meeting; and
  determining a state of the attendance signal based on the accessed state of the status indicator of the user.

Item 4. The data processing system of any one of items 1-3, wherein to determine the attended amount of time for the scheduled meeting, the machine-readable storage medium further includes instructions configured to cause the processor to perform operations of:
  accessing a state of a status indicator of the user, the status indicator representing whether the user is available or is in a meeting based on whether the user device of the user logs into a meeting;
  determining a change in the status indicator of the user; and
  monitoring the changed status indicator of the user.

Item 5. The data processing system of any one of items 1-4, wherein:
  to monitor the attendance signal, the machine-readable storage medium further includes instructions configured to cause the processor to perform operations of accumulating an amount of time the attendance signal is present over a prespecified period of time, the accumulated attendance signal representing an accumulated attended amount of time in meetings during the prespecified period of time; and
  to determine the attendance ratio, the machine-readable storage medium further includes instructions configured to cause the processor to perform operations of determining the attendance ratio based on the accumulated attended amount of time and an accumulated planned meetings time for scheduled meetings during the prespecified period of time.

Item 6. The data processing system of any one of items 1-5, wherein the attendance signal is generated in response to the processor receiving the attendance signal from the user device.

Item 7. The data processing system of any one of items 1-6, wherein the attendance signal is generated in response to the user interacting with a user interface displayed on the user device to join the scheduled meeting.

Item 8. The data processing system of any one of items 1-7, wherein the machine-readable storage medium includes instructions configured to cause the processor to perform operations of:
  capturing images of the user during the scheduled meeting;
  analyzing the images using a neural network to detect eyes of the user in the series of images;
  determining that the user is squinting by analyzing the eyes of the user; and
  determining further that the user is potentially fatigued based on the squinting.

Item 9. The data processing system of any one of items 1-8, wherein the machine-readable storage medium includes instructions configured to cause the processor to perform operations of:
  capturing images of the user during the scheduled meeting;
  analyzing the images using a neural network to track head movement, eye movement, or both of the user; and
  determining further that the user is potentially fatigued based on the head movement, eye movement, or both of the user Item 10. The data processing system of any one of items 1-9, wherein the machine-readable storage medium includes instructions configured to cause the processor to perform operations of:

capturing images of the user during the scheduled meeting;

analyzing the images using a neural network to detect expressions of the user; and determining further that the user is potentially fatigued based on the detected expressions.

Item 11. The data processing system of any one of items 1-10, wherein the machine-readable storage medium includes instructions configured to cause the processor to perform operations of:

capturing images of the user during the scheduled meeting;

analyzing the images using a neural network to detect a gaze of the user; and determining further that the user is potentially fatigued based on the detected gaze.

Item 12. A method implemented in a data processing system, the method comprising:

accessing information about a scheduled meeting of a user, the information including a start time and an end time of the scheduled meeting;

determining a planned meeting time for the scheduled meeting based on the accessed information;

receiving an attendance signal which indicates that the user has joined the scheduled meeting;

monitoring the attendance signal to determine an attended amount of time of the user in the scheduled meeting, wherein the attendance signal represents a user device of the user joining the scheduled meeting;

determining an attendance ratio based on the attended amount of time and the planned meeting time for the scheduled meeting;

classifying the user as potentially fatigued based on the attendance ratio satisfying a threshold condition; and in response to the user being classified as potentially fatigued, performing a prescribed operation including:
  (1) causing a message to be displayed on a display of the user device suggesting the user take a break; or
  (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

Item 13. The method of item 12, wherein monitoring the attendance signal further comprises:

accessing a state of a status indicator of the user, the status indicator representing whether the user is available or is in a meeting based on whether the user device of the user logs into a meeting; and determining a state of the attendance signal based on the accessed state of the status indicator of the user.

Item 14. The method of any one of items 12-13, further comprising:

accessing a state of a status indicator of the user, the status indicator representing whether the user is available or is in a meeting based on whether the user device of the user logs into a meeting;

determining a change in the status indicator of the user; and monitoring the changed status indicator of the user to determine the attended amount of time.

Item 15. The method of any one of items 12-14, further comprising:

capturing images of the user during the scheduled meeting;

analyzing the images using a neural network to detect eyes of the user in the series of images;

determining that the user is squinting by analyzing the eyes of the user; and determining further that the user is potentially fatigued based on the squinting.

Item 16. The method of any one of items 12-15, further comprising:

capturing images of the user during the scheduled meeting;

analyzing the images using a neural network to track head movement, eye movement, or both of the user; and determining further that the user is potentially fatigued based on the head movement, eye movement, or both of the user.

Item 17. A machine-readable medium on which are stored instructions that, when executed, cause a processor of a programmable device to perform operations of:

accessing information about a scheduled meeting of a user, the information including a start time and an end time of the scheduled meeting;

determining a planned meeting time for the scheduled meeting based on the accessed information;

receiving an attendance signal indicating that the user has joined the scheduled meeting;

monitoring the attendance signal to determine an attended amount of time of the user in the scheduled meeting, wherein the attendance signal represents a user device of the user joining the scheduled meeting;

determining an attendance ratio based on the attended amount of time and the planned meeting time for the scheduled meeting;

classifying the user as potentially fatigued based on the attendance ratio satisfying a threshold condition; and in response to the user being classified as potentially fatigued, performing a prescribed operation including:
  (1) causing a message to be displayed on a display of the user device suggesting the user take a break; or
  (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

Item 18. The machine-readable medium of item 17, wherein the machine-readable medium includes instructions configured to cause the processor to perform operations of:

capturing images of the user during the scheduled meeting;

analyzing the images using a neural network to detect eyes of the user in the series of images;

determining that the user is squinting by analyzing the eyes of the user; and determining further that the user is potentially fatigued based on the squinting.

Item 19. The machine-readable medium of any one of items 17-18, wherein the machine-readable medium includes instructions configured to cause the processor to perform operations of:

capturing images of the user during the scheduled meeting;

analyzing the images using a neural network to track head movement, eye movement, or both of the user; and determining further that the user is potentially fatigued based on the head movement, eye movement, or both of the user.

Item 20. The machine-readable medium of any one of items 17-19, wherein the machine-readable medium includes instructions configured to cause the processor to perform operations of:

capturing images of the user during the scheduled meeting;

analyzing the images using a neural network to detect expressions of the user; and determining further that the user is potentially fatigued based on the detected expressions.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations comprising:
   accessing information about a scheduled meeting of a user, the information including a start time and an end time of the scheduled meeting;
   determining a planned meeting time for the scheduled meeting based on the accessed information;
   receiving an attendance signal which indicates that the user has joined the scheduled meeting;
   monitoring the attendance signal to determine an attended amount of time of the user in the scheduled meeting, wherein the attendance signal represents a user device of the user joining the scheduled meeting;
   determining an attendance ratio based on the attended amount of time and the planned meeting time for the scheduled meeting;
   classifying the user as potentially fatigued based on the attendance ratio satisfying a threshold condition; and
   in response to the user being classified as potentially fatigued, performing a prescribed operation including:
      (1) causing a message to be displayed on a display of the user device suggesting the user take a break; or
      (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

2. The data processing system of claim 1, wherein the accessing the information includes accessing an agenda of the user.

3. The data processing system of claim 1, wherein to monitor the attendance signal, the machine-readable storage medium further includes instructions configured to cause the processor to perform operations of:
    accessing a state of a status indicator of the user, the status indicator representing whether the user is available or is in a meeting based on whether the user device of the user logs into a meeting; and
    determining a state of the attendance signal based on the accessed state of the status indicator of the user.

4. The data processing system of claim 1, wherein to determine the attended amount of time for the scheduled meeting, the machine-readable storage medium further includes instructions configured to cause the processor to perform operations of:
    accessing a state of a status indicator of the user, the status indicator representing whether the user is available or is in a meeting based on whether the user device of the user logs into a meeting;
    determining a change in the status indicator of the user; and
    monitoring the changed status indicator of the user.

5. The data processing system of claim 1, wherein:
    to monitor the attendance signal, the machine-readable storage medium further includes instructions configured to cause the processor to perform operations of accumulating an amount of time the attendance signal is present over a prespecified period of time, the accumulated attendance signal representing an accumulated attended amount of time in meetings during the prespecified period of time; and
    to determine the attendance ratio, the machine-readable storage medium further includes instructions configured to cause the processor to perform operations of determining the attendance ratio based on the accumulated attended amount of time and an accumulated planned meetings time for scheduled meetings during the prespecified period of time.

6. The data processing system of claim 1, wherein the attendance signal is generated in response to the processor receiving the attendance signal from the user device.

7. The data processing system of claim 1, wherein the attendance signal is generated in response to the user interacting with a user interface displayed on the user device to join the scheduled meeting.

8. The data processing system of claim 1, wherein the machine-readable storage medium includes instructions configured to cause the processor to perform operations of:
    capturing images of the user during the scheduled meeting;
    analyzing the images using a neural network to detect eyes of the user in the images;
    determining that the user is squinting by analyzing the eyes of the user; and
    determining further that the user is potentially fatigued based on the squinting.

9. The data processing system of claim 1, wherein the machine-readable storage medium includes instructions configured to cause the processor to perform operations of:
    capturing images of the user during the scheduled meeting;
    analyzing the images using a neural network to track head movement, eye movement, or both of the user; and
    determining further that the user is potentially fatigued based on the head movement, eye movement, or both of the user.

10. The data processing system of claim 1, wherein the machine-readable storage medium includes instructions configured to cause the processor to perform operations of:
    capturing images of the user during the scheduled meeting;
    analyzing the images using a neural network to detect expressions of the user; and
    determining further that the user is potentially fatigued based on the detected expressions.

11. The data processing system of claim 1, wherein the machine-readable storage medium includes instructions configured to cause the processor to perform operations of:
    capturing images of the user during the scheduled meeting;
    analyzing the images using a neural network to detect a gaze of the user; and
    determining further that the user is potentially fatigued based on the detected gaze.

12. A method implemented in a data processing system, the method comprising:
    accessing information about a scheduled meeting of a user, the information including a start time and an end time of the scheduled meeting;
    determining a planned meeting time for the scheduled meeting based on the accessed information;
    receiving an attendance signal which indicates that the user has joined the scheduled meeting;
    monitoring the attendance signal to determine an attended amount of time of the user in the scheduled meeting, wherein the attendance signal represents a user device of the user joining the scheduled meeting;
    determining an attendance ratio based on the attended amount of time and the planned meeting time for the scheduled meeting;
    classifying the user as potentially fatigued based on the attendance ratio satisfying a threshold condition; and
    in response to the user being classified as potentially fatigued, performing a prescribed operation including:
        (1) causing a message to be displayed on a display of the user device suggesting the user take a break; or
        (2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

13. The method of claim 12, wherein monitoring the attendance signal further comprises:
    accessing a state of a status indicator of the user, the status indicator representing whether the user is available or is in a meeting based on whether the user device of the user logs into a meeting; and
    determining a state of the attendance signal based on the accessed state of the status indicator of the user.

14. The method of claim 12, further comprising:
    accessing a state of a status indicator of the user, the status indicator representing whether the user is available or is in a meeting based on whether the user device of the user logs into a meeting;
    determining a change in the status indicator of the user; and
    monitoring the changed status indicator of the user to determine the attended amount of time.

15. The method of claim 12, further comprising:
capturing images of the user during the scheduled meeting;
analyzing the images using a neural network to detect eyes of the user in the images;
determining that the user is squinting by analyzing the eyes of the user; and
determining further that the user is potentially fatigued based on the squinting.

16. The method of claim 12, further comprising:
capturing images of the user during the scheduled meeting;
analyzing the images using a neural network to track head movement, eye movement, or both of the user; and
determining further that the user is potentially fatigued based on the head movement, eye movement, or both of the user.

17. A machine-readable medium on which are stored instructions that, when executed, cause a processor of a programmable device to perform operations of:
accessing information about a scheduled meeting of a user, the information including a start time and an end time of the scheduled meeting;
determining a planned meeting time for the scheduled meeting based on the accessed information;
receiving an attendance signal indicating that the user has joined the scheduled meeting;
monitoring the attendance signal to determine an attended amount of time of the user in the scheduled meeting, wherein the attendance signal represents a user device of the user joining the scheduled meeting;
determining an attendance ratio based on the attended amount of time and the planned meeting time for the scheduled meeting;
classifying the user as potentially fatigued based on the attendance ratio satisfying a threshold condition; and
in response to the user being classified as potentially fatigued, performing a prescribed operation including:
(1) causing a message to be displayed on a display of the user device suggesting the user take a break; or
(2) identifying a future meeting of the user subsequent to the classifying by accessing schedule data specifying meeting schedules of the user; and (a) sending a message to attendees of the future meeting indicating that the user would be late or will not be able to attend; or (b) sending a request to reschedule or cancel the future meeting.

18. The machine-readable medium of claim 17, wherein the machine-readable medium includes instructions configured to cause the processor to perform operations of:
capturing images of the user during the scheduled meeting;
analyzing the images using a neural network to detect eyes of the user in the images;
determining that the user is squinting by analyzing the eyes of the user; and
determining further that the user is potentially fatigued based on the squinting.

19. The machine-readable medium of claim 17, wherein the machine-readable medium includes instructions configured to cause the processor to perform operations of:
capturing images of the user during the scheduled meeting;
analyzing the images using a neural network to track head movement, eye movement, or both of the user; and
determining further that the user is potentially fatigued based on the head movement, eye movement, or both of the user.

20. The machine-readable medium of claim 17, wherein the machine-readable medium includes instructions configured to cause the processor to perform operations of:
capturing images of the user during the scheduled meeting;
analyzing the images using a neural network to detect expressions of the user; and
determining further that the user is potentially fatigued based on the detected expressions.

\* \* \* \* \*